(12) United States Patent
Byrne et al.

(10) Patent No.: US 6,293,273 B1
(45) Date of Patent: Sep. 25, 2001

(54) PORTABLE GAS GRILL WITH REMOVABLE LP GAS CYLINDER DOLLY

(75) Inventors: Robert M. Byrne, Lima; Kurt F. Hafeken, Sr., Elida, both of OH (US)

(73) Assignee: American Trim, LLC, Lima, OH (US)

( * ) Notice: Subject to any disclaimer, the term of this patent is extended or adjusted under 35 U.S.C. 154(b) by 0 days.

(21) Appl. No.: 09/627,671

(22) Filed: Jul. 28, 2000

(51) Int. Cl.⁷ .............................. F24C 15/00; B62B 1/00
(52) U.S. Cl. .......................................... 126/41 R; 126/275
(58) Field of Search .............................. 126/25 R, 41 R, 126/276; 280/35, 47.24, 47.371, 659

(56) References Cited

U.S. PATENT DOCUMENTS

| | | | |
|---|---|---|---|
| 2,784,979 | * 3/1957 | Chamberlin et al. | 280/47.24 |
| 4,356,988 | 11/1982 | McIntosh . | |
| 4,544,173 | 10/1985 | Kellermyer . | |
| 4,666,179 | * 5/1987 | Adams | 280/47.24 |
| 5,109,834 | 5/1992 | Collins et al. | 126/41 R |
| 5,318,322 | 6/1994 | Home . | |
| 5,489,183 | 2/1996 | Malden et al. . | |
| 5,513,939 | 5/1996 | Martin et al. . | |
| 5,603,256 | 2/1997 | Charleson et al. . | |
| 5,752,433 | 5/1998 | Charlson et al. . | |
| 5,800,117 | 9/1998 | Milton . | |
| 5,931,149 | 8/1999 | Lewis | 126/41 R |
| 5,934,184 | 8/1999 | Schlosser et al. . | |
| 5,941,543 | * 8/1999 | Kazmark, Jr. | 280/47.371 |
| 6,042,130 | 3/2000 | Souza . | |

FOREIGN PATENT DOCUMENTS

| | | | |
|---|---|---|---|
| 9101941-A | * 12/1992 | (BR) . | |
| 2213259-A | * 8/1989 | (GB) | 126/25 R |

\* cited by examiner

Primary Examiner—Sara Clarke
(74) Attorney, Agent, or Firm—Rankin, Hill, Porter & Clark LLP

(57) ABSTRACT

The present invention provides a portable gas grill for cooking food that burns LP gas stored in a 20# class vertical LP gas cylinder having a foot ring. The portable gas grill according to the invention includes a grill cart including a plurality of vertical posts supporting a fire box and a base that connects the vertical posts. The portable gas grill further includes a wheeled dolly including a generally horizontal loading platform that is adapted to receive the foot ring of a 20# class vertical LP gas cylinder. The loading platform is adapted to removably connect to the base of the grill cart. Preferably, the wheeled dolly further includes a generally vertical retractable frame member having a lower end that is fixedly connected to said loading platform. More preferably, the vertical frame member is retractable such that in a retracted position it is about the same height as a 20# class vertical LP gas cylinder having a foot ring received by the loading platform.

9 Claims, 4 Drawing Sheets

PORTABLE GAS GRILL WITH REMOVABLE LP GAS CYLINDER DOLLY

FIELD OF INVENTION

The present invention relates to a portable gas grill used for cooking food, and more particularly to a portable gas grill having a LP gas cylinder dolly removably connected thereto.

BACKGROUND OF THE INVENTION

As recently as the mid-1970's, more than 90% of all portable grills used to cook food in the United States used charcoal as the heat producing fuel. Although portable grills that use LP gas to produce heat have been and continue to be generally more expensive at the time of purchase than portable grills fueled by charcoal and other means, the convenience, cleanliness and the heat control provided by portable LP gas grills have made them the product of choice among consumers. Presently, more portable LP gas fueled grills are sold in the United States each year than all portable grills fueled by charcoal, electric and natural gas combined.

The most common LP gas used to fuel portable gas grills is propane. Propane and other LP gases are typically stored in metal containers called cylinders. The 20# class vertical LP gas cylinder is by far the most common size of LP gas cylinder used in connection with portable gas grills. A 20# class vertical LP gas cylinder can be filled with approximately four gallons of LP gas. When properly filled to capacity with propane, such cylinders weigh about 20 pounds.

Most portable gas grills comprise a wheeled grill cart having one or more vertical posts that support a fire box. The fire box supports and contains a gas burner and a generally horizontal cooking surface. Typically, a 20# class vertical LP gas cylinder is placed on a lower portion of the grill cart below and preferably to the side of the fire box. The disclosures of the following patents are hereby incorporated by reference for their teachings regarding the various configurations of portable gas grills: McIntosh, U.S. Pat. No. 4,356,988; Collins et al., U.S. Pat. No. 5,109,834; Charlson et al., U.S. Pat. No. 5,603,256; and Schlosser et al., U.S. Pat. No. 5,934,184.

The prior art discloses several means of securing LP gas cylinders to the lower portions of grill carts. However, each prior art reference generally requires that the user physically maneuver a 20 pound LP gas cylinder into a relatively confined space that is situated close to the ground. The following patents are incorporated by reference for their teachings regarding the various ways LP gas cylinders have been attached to the base of grill carts: Charlson et al., U.S. Pat. No. 5,603,256; Lewis, U.S. Pat. No. 5,931,149; and Schlosser et al., U.S. Pat. No. 5,934,184.

When an LP gas cylinder becomes empty through use, the user must disconnect it from the portable gas grill and transport it to an LP gas filling station to be refilled. Once filled, the user must then transport the refilled LP gas cylinder back to the portable gas grill and reposition it on the lower portion of the grill cart. Various factors including the size and weight of a full LP gas cylinder and the design of conventional portable gas grills can make it quite difficult for a user to transport and reconnect a full LP gas cylinder to a portable gas grill. A device is needed that can be used to facilitate the transportation of LP gas cylinders used with portable gas grills and make them easier to connect to such grills.

SUMMARY OF INVENTION

The present invention is directed to a portable gas grill for cooking food that burns LP gas stored in a 20# class vertical LP gas cylinder having a foot ring. The portable gas grill according to the present invention comprises a grill cart comprising a plurality of vertical posts supporting a fire box and a base that connects said vertical posts. The portable gas grill further comprises a wheeled dolly comprising a generally horizontal loading platform that is adapted to receive the foot ring of a 20# class vertical LP gas cylinder. The loading platform of the wheeled dolly is adapted to removably connect to the base of said grill cart. Preferably, the wheeled dolly further comprises a generally vertical retractable frame member having a lower end that is fixedly connected to said loading platform.

The device according to the present invention facilitates the transportation and connection of 20# class vertical LP gas cylinders to the grill carts of portable gas grills. The generally horizontal loading platform of the wheeled dolly is adapted to receive the foot ring of a 20# class vertical LP gas cylinder. Preferably, the vertical frame member of the dolly is provided with a strap that further assists in securing the LP gas cylinder to the dolly. More preferably, the vertical frame member is retractable such that in a retracted position it is about the same height as a 20# class vertical LP gas cylinder having a foot ring received by the loading platform.

The device according to the present invention permits a user to transport an LP gas cylinder to and from a portable gas grill with a minimum of effort. The LP gas cylinder rests on the wheeled dolly, which facilitates relatively effortless transportation of the LP gas cylinder, including up and down stairs. Preferably, the dolly is formed from lightweight materials such as aluminum tubing. Because the dolly is constructed of lightweight materials, the LP gas cylinder need not be removed from the dolly even during transportation and refilling.

The loading platform of the dolly is adapted to removably connect to the base of the grill cart. In one preferred embodiment of the invention, the loading platform removably connects to the grill cart by having a generally downwardly projecting edge portion that hooks over a horizontal post that connects a pair of vertical posts supporting a fire box. In another preferred embodiment, the loading platform removably connects to the grill cart by having a generally downwardly projecting edge portion that hooks over an axle that passes through a hole in the lower end of a pair of vertical posts. In yet another embodiment of the invention, the loading platform removably connects to the grill cart by having a generally downwardly projecting pin that fits into a hole provided in the base of the portable gas grill cart.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Figure 1:
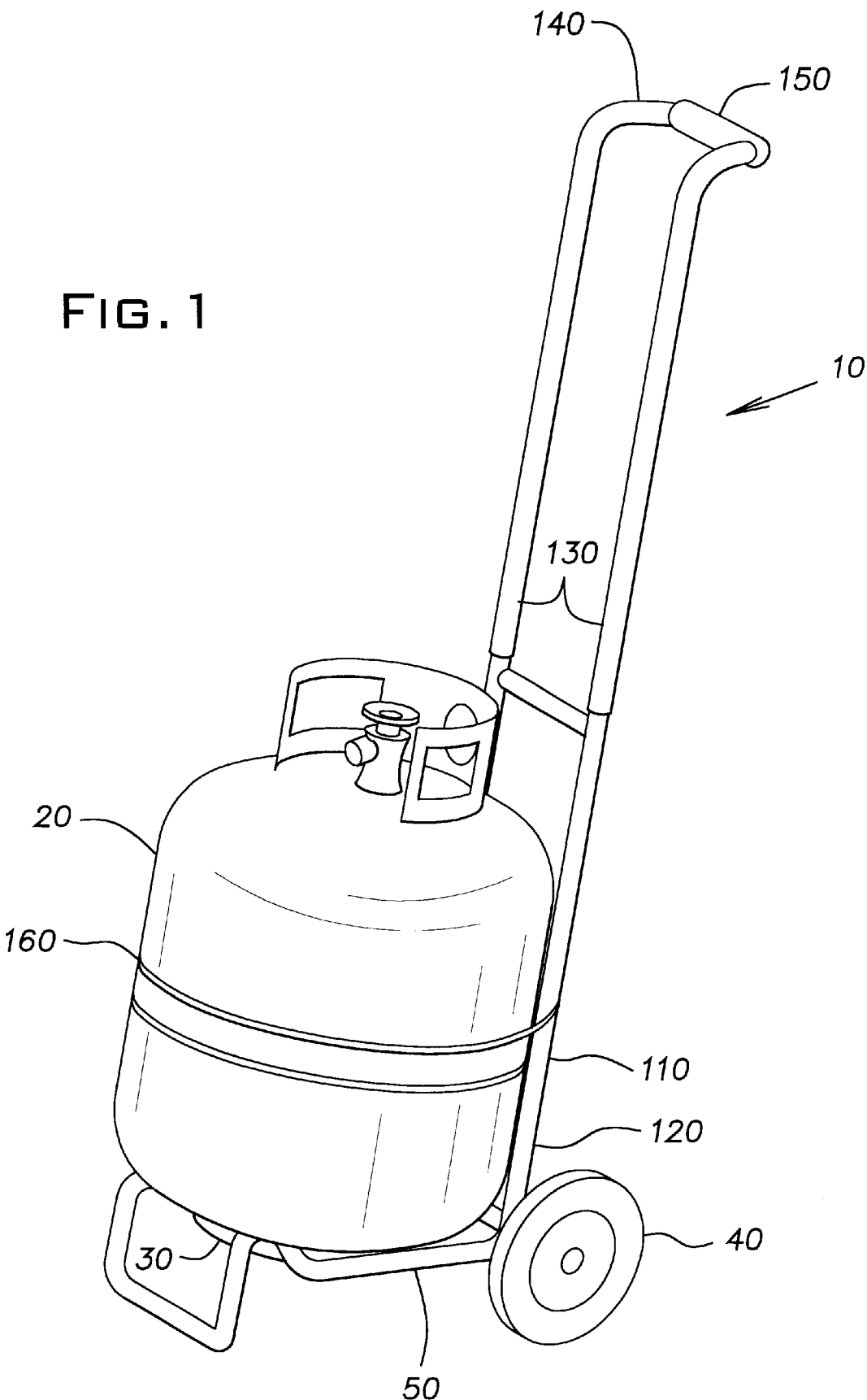
FIG. 1 is a perspective view of a preferred embodiment of a wheeled dolly according to the invention.

With reference to FIG. 1, the present invention provides a device 10 for use in transporting a 20# class vertical LP gas cylinder 20 having a foot ring 30 to a portable gas grill used for cooking food. The disclosures of the following patents are hereby incorporated by reference for their teachings regarding the various configurations of portable gas grills: McIntosh, U.S. Pat. No. 4,356,988; Collins et al., U.S. Pat. No. 5,109,834; Charlson et al., U.S. Pat. No. 5,603,256; and Schlosser et al., U.S. Pat. No. 5,934,184. The device 10 according to the present invention comprises a wheeled dolly 40 comprising a generally horizontal loading platform 50 that is adapted to receive the foot ring 30 of a 20# class vertical LP gas cylinder 20. The loading platform 50 is adapted to be removably connected to a portable gas grill used for cooking food.

Figure 2:
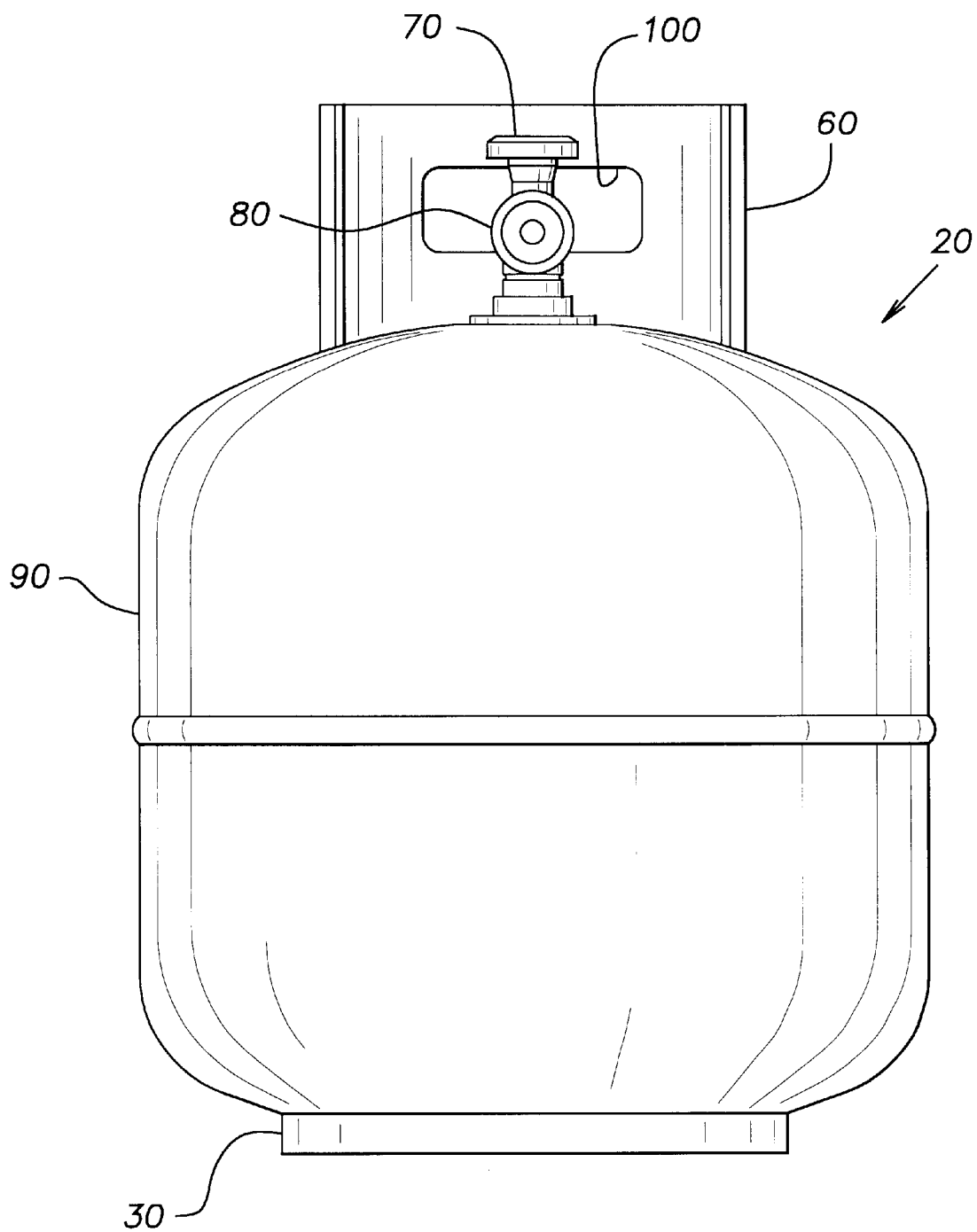
FIG. 2 is a front elevation view of a 20# class vertical LP gas cylinder.

20# class vertical LP gas cylinders are produced in accordance with national standards and guidelines issued by the Department of Transportation (DOT) and the National Fire Protection Agency (NFPA). With reference to FIG. 2, a standard 20# class vertical LP gas cylinder 20 comprises a collar 60, a hand wheel 70, a valve 80, a body 90 and a foot ring 30. Typically, a 20# class vertical LP gas cylinder 20 is a two-piece or three-piece welded steel structure. The hand wheel 70 is situated on the top of the valve 80 and is used to control the flow of LP gas from the body 90 to the portable gas grill. The valve 80 is protected from damage by a steel collar 60 that is welded to the top of the body 90. The collar 60 usually does not extend to the front of the valve 80 because it could interfere with the connections. An opening 100 is usually provided in the collar 60 at the rear of the valve 80 to provide a handle for lifting the LP gas cylinder. The body 90 is supported by a steel foot ring 30 that is welded to the bottom of the body 90 to keep the LP gas cylinder upright and off the ground.

Although it will be appreciated that the relative the dimensions of 20# class vertical LP gas cylinders may vary slightly from manufacturer to manufacturer, the height of a 20# class vertical LP gas cylinder 20 is typically about 17.5 inches measured from the bottom of the foot ring 30 to the top of the collar 60. The diameter of the body 90 taken at its widest point is typically about 12.25 inches. And, the foot ring 30 is typically about 1 inch tall and has a diameter of about 8 inches.

Referring now to FIG. 1, the wheeled dolly 40 preferably further comprises a generally vertical retractable frame member 110 having a lower end 120 that is fixedly connected to the loading platform 50. Preferably, the retractable frame member 110 is about the same height as a 20# class vertical LP gas cylinder 20 having a foot ring 30 received by the loading platform 50 when the retractable frame member 110 is retracted.

In the presently most preferred embodiment of the invention, the retractable frame member 110 comprises at least a pair of spaced apart telescoping members 130 that are connected together at an end 140 opposite the lower end 120 by a handle 150. The telescoping members 130 that comprise the retractable frame member 110 are preferably formed from aluminum tubing. Aluminum tubing is preferred because of its cost, strength, and weight. The loading platform 50 is also preferably constructed from aluminum tubing. Of course the retractable frame member 110 and loading platform 50 could be constructed from other materials such as, for example, polymers and/or steel.

In the most preferred embodiment of the invention, a strap 160 is connected to the wheeled dolly 40. The strap 160 is used to secure the 20# class vertical LP gas cylinder 20 to the wheeled dolly 40. The strap 160 is preferably formed of an elastic material such as rubber or is formed from nylon webbing and appropriate fasteners. The strap 160 preferably wraps around the body 90 of the 20# class vertical LP gas cylinder 20 and the vertical frame member 110.

Figure 3:
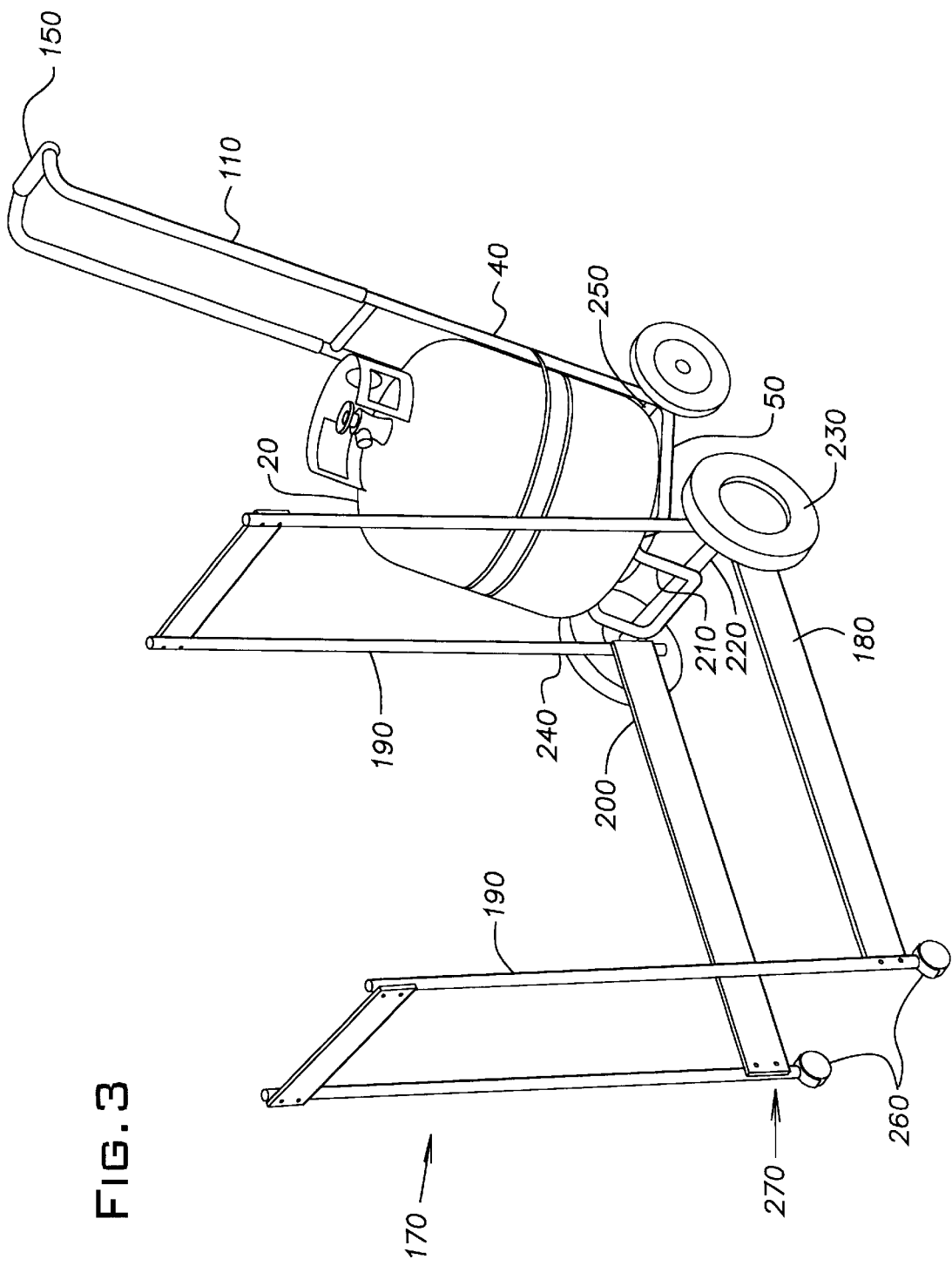
FIG. 3 is a perspective view of one preferred embodiment of the gas grill according to the invention.

Referring now to FIG. 3, a portable gas grill 170 according to the present invention comprises a grill cart 180 comprising a plurality of vertical posts 190 supporting a fire box (not shown) and a base 200 that connects the vertical posts 190 together. The portable gas grill 170 further comprises a wheeled dolly 40 comprising a generally horizontal loading platform 50 that is adapted to receive a 20# class vertical LP gas cylinder 20. The loading platform 50 is adapted to removably connect to the base 200 of the grill cart 170.

In a preferred embodiment of the invention, the base 200 of the grill cart 180 comprises a generally horizontal post that connects a pair of vertical posts 190 together. The loading platform 50 preferably further comprises a generally downwardly projecting edge portion 210 that hooks over the horizontal post to removably connect the loading platform 50 to the base 200 of the grill cart 180.

In another preferred embodiment of the invention illustrated in FIG. 3, the base 200 of the grill cart 180 comprises an axle 220 having a wheel 230 attached at each end that passes through a hole provided in the lower ends 240 of a pair of vertical posts 190. In such embodiment, the generally downwardly projecting edge portion 210 of the loading platform 50 hooks over the axle 220 to removably connect the loading platform 50 to the base 200 of the grill cart 180.

It will be appreciated that the manner in which the loading platform 50 is removably connected to the grill cart 180 is not per se critical, and that an almost limitless variety of removable connections could be successfully employed. For example, the loading platform 50 could further comprise a generally downwardly projecting pin (not shown) that would fit into a hole provided in the base 200 of the grill cart 180. Preferably, the loading platform 50 can be connected and disconnected from the grill cart 180 without need for any tools and while the user is in a standing position.

In FIG. 3, the retractable frame member 110 is shown in a fully extended position. FIG. 3 also shows the wheeled dolly 40 in a tilted-back position as if the 20# class vertical LP gas cylinder 20 was in the process of being connected to or disconnected from the base 200 of the grill cart 180. To facilitate the tilting-back of the wheeled dolly 40, the user can place one of his or her feet on the axle 250 of the wheeled dolly 40 and pull the handle 150 toward his or her body. To connect the loading platform 50 to the base 200 of the grill cart 180, the user simply hooks the generally downward projecting edge portion 210 of the loading platform 50 over the axle 220 and allows the wheeled dolly 40 to achieve an upright position.

Figure 4:
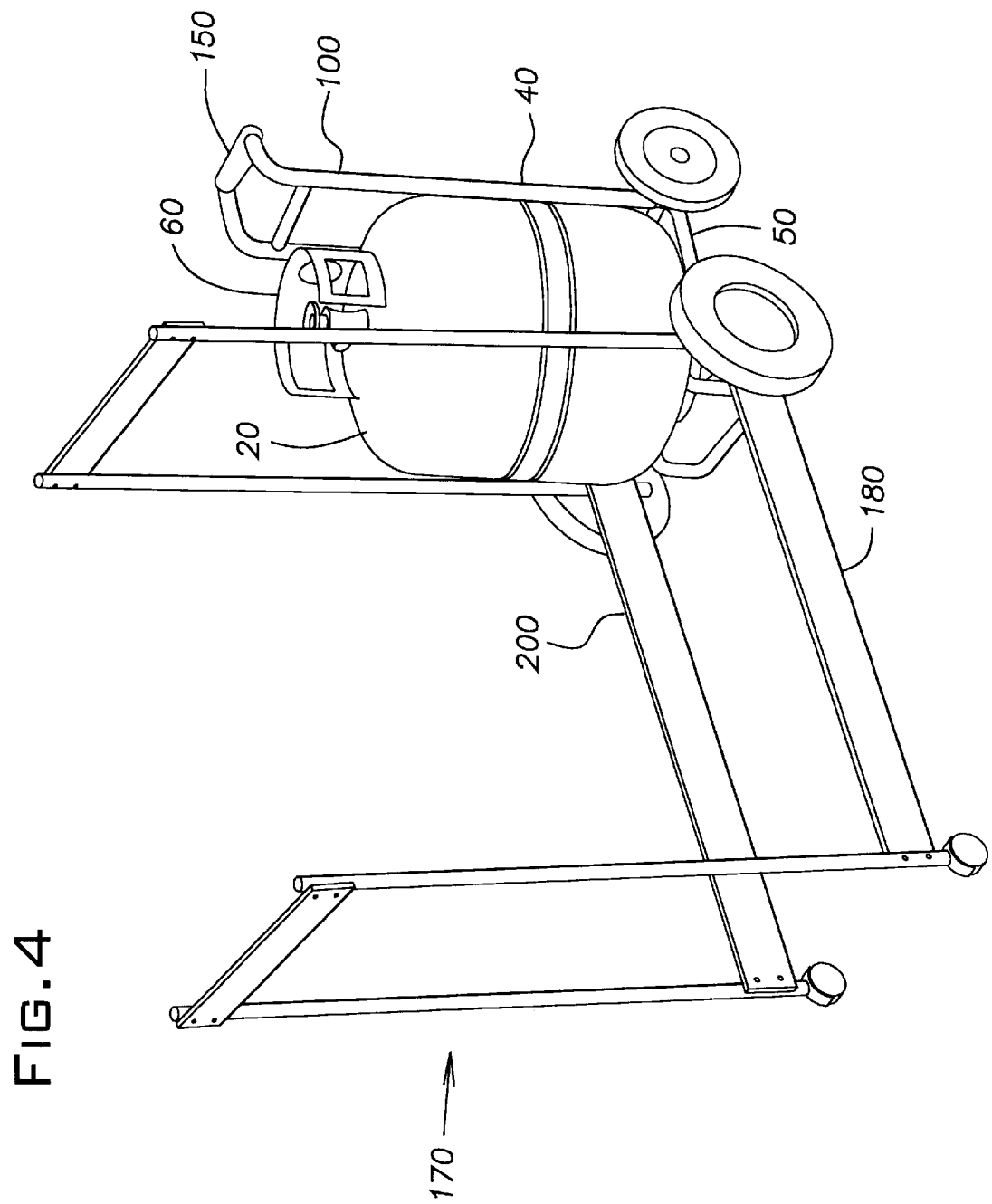
FIG. 4 is another perspective view the gas grill shown in FIG. 3.

FIG. 4 depicts a portable gas grill 170 according to the present invention wherein the wheeled dolly 40 is connected to the base 200 of the grill cart 180. The retractable frame member 110 is shown in a fully retracted position. In the fully retracted position, the handle 150 of the retractable frame member 110 is at about the same height as the collar 60 of the 20# class vertical LP gas cylinder 20 on loading platform 50. The retractable frame member 110 is preferably kept in the retracted position when the portable gas grill 170 is in use, and is only retracted when a 20# class vertical LP gas cylinder 20 needs to be transported to or away from the grill cart 170.

It will be appreciated that the device 10 according to the present invention can be used with virtually any configuration of portable gas grill 170. For example, the portable gas grill 170 shown in FIG. 3 depicts a grill cart 180 having a pair of casters 260 that are attached to the end 270 of the grill cart 180 that is opposite where the loading platform 50 is removably connected to the grill cart 180. It will be appreciated that casters 260 facilitate the movement of the portable gas grill, but are not essential to the present invention. In most prior art portable gas grills, pegs (not shown) are used instead of casters 260.

Use of the device 10 according to the invention provides the added benefit of improving the stability of portable gas grills 170 during movement. In many prior art portable gas grills, the 20# vertical LP gas cylinder is situated on the grill cart directly over or the wheels or off to the side of the wheels away from the center mass. This is done for at least two reasons: (1) to keep the 20# vertical LP gas cylinder as far away from the heat generated in the fire box as possible; and (2) to make it unnecessary for a user to lift the full weight of the 20# vertical LP gas cylinder in order to move the portable gas grill. The undesired result of this configuration is that the portable gas grills of this type have a tendency to want to tip in the direction of the 20# vertical LP gas cylinder during movement.

It will be appreciated that the device 10 according to the present invention provides substantial advantages over prior art portable gas grills in terms of stability. According to the present invention, the weight of a 20# vertical LP gas cylinder 20 is supported by a loading platform 50 of a wheeled dolly 40 that is situated to the side of the portable gas grill 170 away from the fire box. In other words, the weight of the 20# vertical LP gas cylinder is not supported by the grill cart 180. Therefore, the portable gas grill does not have a tendency to want to tip in the direction of the 20# vertical LP gas cylinder when the portable gas grill is moved by a user.

It will be appreciated that various other accessories can be used in combination with the device 10 according to the present invention. For example, the device 10 according to the present invention could further comprise means for monitoring the amount of LP gas remaining in the 20# vertical LP gas cylinder, such as spring balances, scales, and gauges. In addition, the device 10 according to the present invention could further comprise covers or guards to protect or conceal the 20# vertical LP gas cylinder from view.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A portable gas grill for cooking food that burns LP gas stored in a 20# class vertical LP gas cylinder having a foot ring, said grill comprising:

a grill cart comprising a plurality of vertical posts supporting a fire box and a base that connects said vertical posts; and a wheeled dolly comprising a generally horizontal loading platform that is adapted to receive the foot ring of a 20# class vertical LP gas cylinder, said loading platform being adapted to removably connect to the base of said grill cart.

2. The portable gas grill according to claim 1 wherein said wheeled dolly further comprises a generally vertical retractable frame member having a lower end that is fixedly connected to said loading platform.

3. The portable gas grill according to claim 2 wherein said retractable frame member is about the same height as a 20# class vertical LP gas cylinder having a foot ring received by said loading platform when said frame member is retracted.

4. The portable gas grill according to claim 3 wherein said retractable frame member comprises at least a pair of spaced apart telescoping members that are connected together at an end opposite said lower end by a handle.

5. The portable gas grill according to claim 4 wherein said retractable frame member comprises aluminum tubing.

6. The portable gas grill according to claim 1 wherein the base of said grill cart further comprises a generally horizontal post connecting a pair of said vertical posts, and wherein said loading platform comprises a generally downwardly projecting edge portion that hooks over said horizontal post to removably connect said loading platform to the base of said grill cart.

7. The portable gas grill according to claim 1 wherein the base of said grill cart further comprises an axle having a wheel attached at each end that passes through a hole provided in a lower end of a pair of said vertical posts, and wherein said loading platform comprises a generally downwardly projecting edge portion that hooks over said axle to removably connect said loading platform to the base of said grill cart.

8. The portable gas grill according to claim 1 wherein said loading platform comprises aluminum tubing.

9. The portable gas grill according to claim 1 further comprising a strap connected to said wheeled dolly for securing said 20# class vertical LP gas cylinder to said wheeled dolly.

\* \* \* \* \*